United States Patent [19]

Diessner et al.

[11] Patent Number: 4,697,621

[45] Date of Patent: Oct. 6, 1987

[54] METHOD AND DEVICE FOR FILLING A FLUID FRICTION CLUTCH

[75] Inventors: Eberhard Diessner; Ulrich Zahn, both of Wolfsburg, Fed. Rep. of Germany

[73] Assignee: Volkswagen Aktiengesellschaft, Wolfsburg, Fed. Rep. of Germany

[21] Appl. No.: 861,092

[22] Filed: May 8, 1986

[30] Foreign Application Priority Data

Jun. 8, 1985 [DE] Fed. Rep. of Germany ....... 3520585

[51] Int. Cl.$^4$ ..................... B65B 3/26; F16D 35/00
[52] U.S. Cl. .................................. 141/1; 141/83; 141/95; 141/198; 192/58 R; 192/58 B; 192/112
[58] Field of Search ............... 192/58 R, 58 B, 56 F, 192/112, 113 B, 30 R; 141/1, 94, 95, 198, 83; 188/290, 296; 464/23

[56] References Cited

U.S. PATENT DOCUMENTS

| | | | |
|---|---|---|---|
| 2,073,930 | 3/1937 | Gray | 141/94 |
| 2,514,137 | 7/1950 | O'Connor | 188/290 |
| 2,708,018 | 5/1955 | Dudley | 192/58 R |
| 3,228,494 | 1/1966 | Rumsey | 192/58 B |
| 3,373,633 | 3/1968 | Desmond et al. | 192/58 B |
| 3,939,880 | 2/1976 | Zook et al. | 141/1 |
| 4,040,271 | 8/1977 | Rolt et al. | 192/58 B |
| 4,157,748 | 6/1979 | Beaujean | 192/58 B |

FOREIGN PATENT DOCUMENTS 2135791 4/1976 Fed. Rep. of Germany.

Primary Examiner—Rodney H. Bonck
Assistant Examiner—David A. Testardi
Attorney, Agent, or Firm—Brumbaugh, Graves, Donohue & Raymond

[57] ABSTRACT

A method is described for filling a fluid friction clutch having a drive and a driven side with sets of clutch plates, whose housing, closed off from the outside, is partially filled to a relatively high degree with a viscous liquid medium as well as a device for practicing such method. To permit precise filling of the fluid friction clutch conformably to its characteristic, the housing of the fluid friction clutch is connected to a filling means delivering a viscous liquid medium. Further, the fluid friction clutch is connected to a drive means generating a drive torque on the drive side and to a torque measuring means gauging the torque transmitted by the clutch on the driven side. Depending on the results of a comparison made during operation of the drive means between the actual value of the torque transmitted and a preassigned target value, the filling means is actuated so as to fill the housing with an amount of fill that will yield the target torque value.

9 Claims, 2 Drawing Figures

METHOD AND DEVICE FOR FILLING A FLUID FRICTION CLUTCH

BACKGROUND OF THE INVENTION

The invention relates to a method for filling a fluid friction clutch housing to a desired degree with a viscous liquid medium, the clutch having sets of clutch plates and drive and driven sides, and to a device for practicing the method.

Fluid friction clutches of the above type are known for example from German patent No. 2,135,791. Their mode of operation is based on the principle, among others, that the high-viscosity liquid medium, consisting preferably of silicone oil, for example polysiloxane, placed in a clutch housing hermetically sealed from the outside, upon rotation of the sets of clutch plates relative to each other, builds up shear stresses owing to its viscosity, which oppose rotation of the sets of plates. The magnitude of these shear stresses and hence the magnitude of the torque transmitted depend, among other parameters, on the degree of fill of the housing with the liquid medium.

The use of such fluid friction clutches, for example in the transmission train of a motor vehicle, requires a precise adjustment of the clutch characteristic, that is, the torque transmission of the clutch or its gradient as a function of time, as well as a matching of speed between the drive and driven sides as a function of time.

These parameters may indeed be tuned by fixing the degree of fill of the clutch housing with liquid medium, but difficulties are involved in determining and/or setting the precise degree of fill of the housing. These difficulties of accurate proportioning reside in the fact that owing to manufacturing tolerances on the clutch parts, there may be internal volume tolerances amounting to a multiple of the allowable fill tolerance. Another problem consists in that deviations in the preassigned fill of the housing cannot be ascertained until such clutches are run on the test stand, when these errors can be rectified only by on-the-spot refilling and recalibration of the clutch.

SUMMARY OF THE INVENTION

Accordingly, it is an object of the invention to provide a method of filling such a fluid friction clutch conformably to its characteristic, and a device for practicing the method by means of which, avoiding the aforesaid disadvantages, fluid friction clutches with precisely tuned torque characteristics can be assembled.

Pursuant to this object, and others which will become apparent hereafter, one aspect of the invention resides in a method for filling a fluid friction clutch including driving the clutch on the drive side, measuring torque on the driven side and filling the clutch directly during the test stand run of the clutch, the result of the measurements then taken of the torque transmitted by the clutch being compared immediately in a suitable control means with a preassigned target value, and the control deviation being used to input the filling means for the clutch. The final result of this filling operation is a clutch having a preassigned clutch characteristic, further affected essentially by errors of measurement only.

In so doing, it is expedient, before connecting the housing of the fluid friction clutch to the drive means and the torque measuring means, to fill the housing with a preassigned basic amount of viscous liquid medium, the basic amount of viscous liquid corresponding more or less to the target fill.

A device for carrying out the above method includes clutch drive means, torque measuring means, fluid filling means, and control means which controls the filling means as a function of actual transmitted torque values delivered by the torque measuring means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
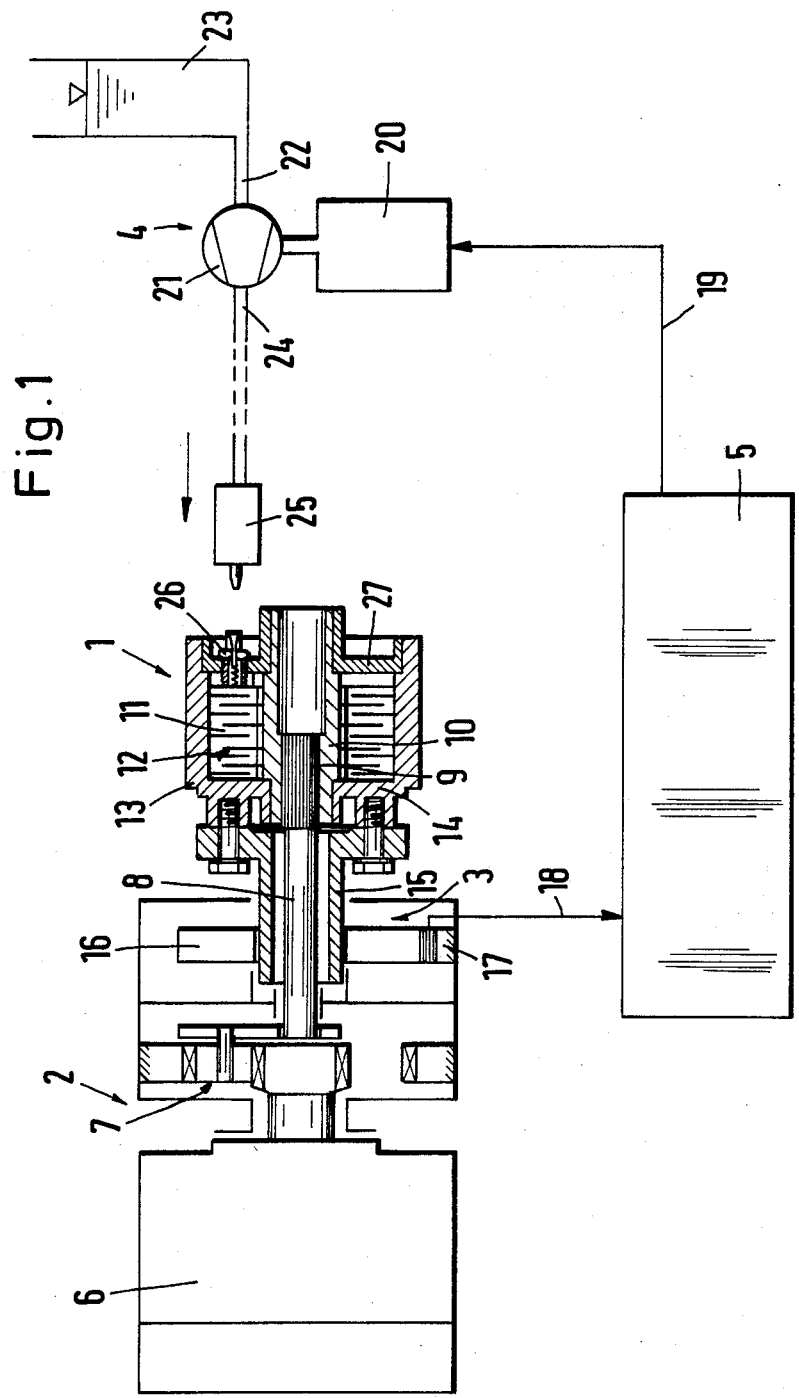
FIG. 1 shows a block diagram of a system for filling a fluid friction clutch, pursuant to the present invention.

In FIG. 1 of the drawing, 1 designates the fluid friction clutch as a whole, connected on the drive side to a drive means 2 and on the driven side to a torque measuring means 3. The signals from the torque measuring means 3 are transmitted over a signal line 18 to a control means 5 as source signals. At the output of this control means 5, a comparison of the source signals with a preassigned target torque value yields a control deviation, which is put into a filling means, designated as a whole by 4, to fill the fluid friction clutch 7 with viscous liquid medium.

The filling means 4 comprises a controllable proportioning pump 21, for example a piston pump, actuable by a control unit 20 in response to the control signals transmitted by way of a signal line 19 from the control means 5. By way of a suction line 22, the proportioning pump 21 the draws the viscous liquid medium, consisting preferably of a silicone oil, from a supply tank 23 and delivers it by way of a pressure line 24 to a filling chamber 25. This filling chamber 25 is coupled liquid- and pressure-tight throughout the rest run of the fluid friction clutch 1 to a check valve 26 mounted on the housing 13 of the fluid friction clutch 1, here for example to an end cover 27 of housing 13, which check value leads directly into the interior 11 of the housing 13.

The connection of the fluid friction clutch 1 to the drive means 2, composed for example of an electric motor 6 followed by a planetary reducing gear 7, is made by having a drive shaft 8 protruding from the drive means 2 and provided with external gear teeth 9 at the end which engage matching internal gear teeth in a hub part 10 of the fluid friction clutch 1.

On the driven side, the housing 13 of the fluid friction clutch 1 is connected to the torque measuring means 3 in that a hollow shaft 15 with a screw connection to the end flange 14 of housing 13 engages a pendulum balance 16 to find the torque transmitted from the fluid friction clutch 1 when driven by the drive means 2, by reading a dynamometer 17 provided in the form of a sensor. This torque is then passed on as source value by way of the signal line 18 to the control means 5.

The fluid friction clutch 1 in principle resembles conventional clutches of this type, having several sets of clutch plates 12 in the interior 11 of housing 13, with rotationally fixed connections to the hub part 10 and to the housing 13 alternately. The clutch plates, as is likewise known, have apertures uniformly distributed over the circumference, in the form of through holes and/or radial slits located on a concentric circle. At the ends of the clutch plate packs 12, pressure plates 30 and 31 are provided.

The interior 11 of housing 13 is moreover hermetically sealed from the outside, and contains within it a high-viscosity liquid medium preferably consisting, as previously indicated, of a silicone oil, for example polysiloxane. At prevailing temperature, however, the fill occupies only a portion, for example 85-99%, of the entire interior of the housing, leaving about 1-15% empty space.

Figure 2:
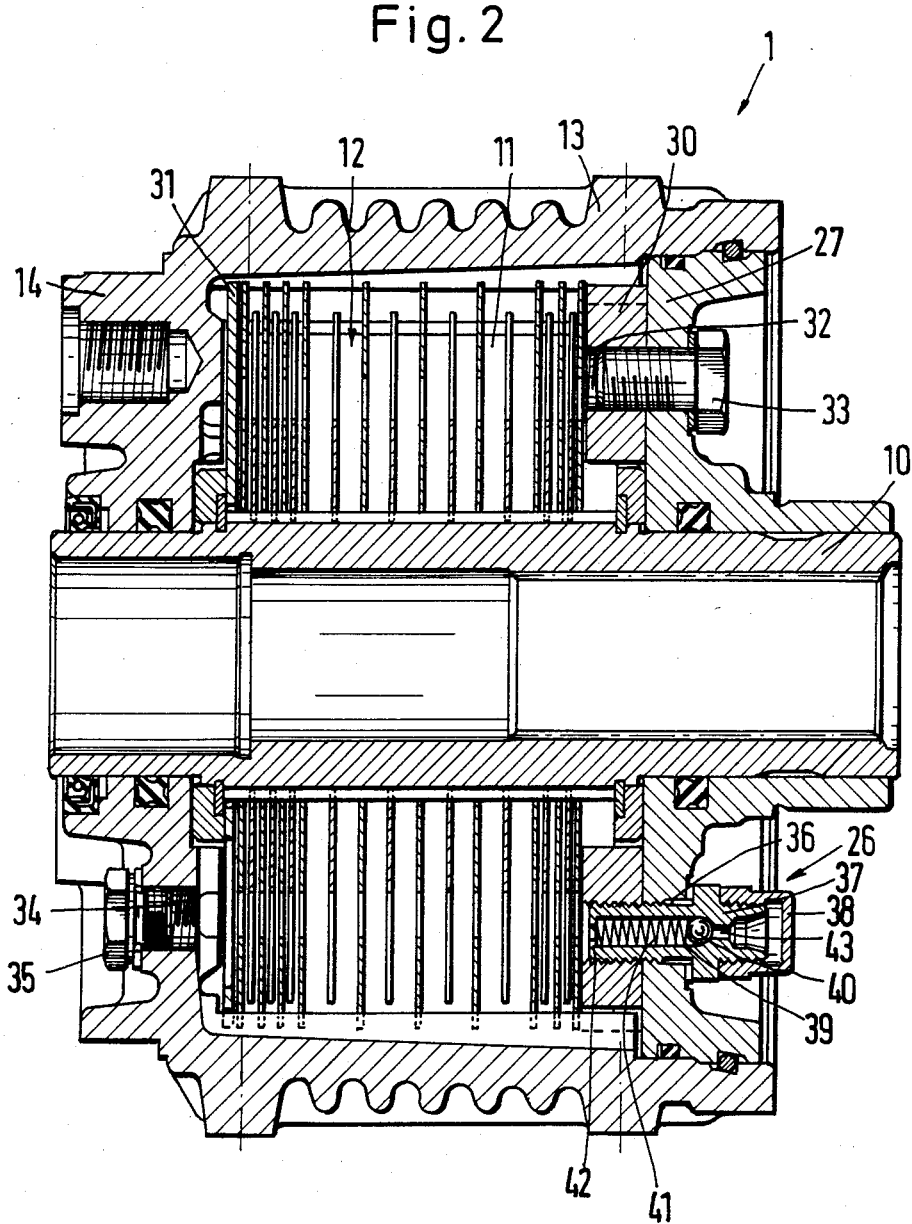
FIG. 2 shows a longitudinal section of the fluid friction clutch.

Filling of the fluid friction clutch with this high-viscosity liquid medium is accomplished by first placing a preassigned basic amount of liquid medium, corresponding more or less to the target amount but preferably slightly less than that amount, in the ready-assembled clutch. For this purpose, two screw plugs 33 and 35 screwed into matching threaded holes 32 and 34 at opposed ends of the housing may be removed, so that the interior housing may be connected to a suction pump on the one hand and to a supply tank filled with liquid medium on the other hand. After the housing has been prefilled, the passages 32 and 34 are closed by means of the plugs 33 and 35, and the fluid friction clutch 1, as shown in FIG. 1 of the drawing, is connected to the drive means 2 on the drive side and to the torque measuring means 3 on the driven side. Additionally, the filling or topping off nozzle 25 of the filling means 4 is connected in a pressure-tight manner to the check valve 26, which, as FIG. 2 shows, consists of a valve member 37 held in a threaded passage 36 through the cover 27 of the housing and the pressure plate 30. This valve body 37, which when not in use may be covered with a closure cap 38, has a closure member 40 in the form of a ball held in a hole 39 and pressed against a valve seat with bore 43 by a spring 41 arranged in said hole. The other end of the valve spring 41 bears on a washer 42 fixed to the end of the valve body 37.

The topping up of the fluid friction clutch 1 to secure a preassigned characteristic of the clutch—the torque gradient, that is to say, as a function of time—is now carried out in accordance with the readings of the torque measuring means 3, which picks up the torques transmitted by the clutch while being driven by the drive means 6. These torque readings are directly compared in the control means 5 with preassigned target values, that is to say with a preassigned target torque gradient with respect to time, and if the actual curve deviates from the target characteristic, control signals are transmitted to the control unit 20 to input the proportioning pump 21. This proportioning pump 21 is so constructed that it delivers a constant flow per unit time, so that by suitable time control of the proportioning pump, discrete amounts of liquid medium are delivered to the interior 11 of the fluid friction clutch 1 by way of the fill valve 26. The proportioning pump 21 is thus actuated to supply additional liquid medium until such time as a preassigned target characteristic of the clutch has been attained.

With suitable dimensioning of the delivery capacity of the proportioning pump, the additional fill required to attain the preassigned characteristic of the clutch can be effected within a few seconds while the test run of the fluid friction clutch is still going on, so that upon completion of the test run, a clutch having a precisely adjusted and verified characteristic has been achieved.

While the invention has been illustrated and described as embodied in a Method and Device for Filling a Fluid Friction Clutch, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic of specific aspects of this invention.

We claim:

1. A method of filling a fluid friction clutch having a drive side and a driven side, and sets of clutch plates in a housing which is closed off from the outside and partially filled to a relatively high degree with a viscous liquid medium, the method comprising the steps of: generating a drive torque on the drive side of the clutch; measuring torque transmitted by the clutch to the driven side; comparing the torque measured with a preassigned torque target value; and delivering a quantity of viscous liquid medium to the housing during said measuring step as a function of the comparison between the torque measured and the preassigned torque target value so that the housing is filled to a point where the clutch produces the preassigned torque target value at the driven side.

2. A method as defined in claim 1, wherein said torque generating step includes generating the drive torque by drive means connectable to the drive side of the fluid friction clutch.

3. A method as described in claim 1, wherein said torque measuring step includes measuring the torque transmitted by torque measuring means connectable to the driven side of the fluid friction clutch.

4. A method as defined in claim 1, wherein said viscous liquid medium delivering step includes delivering the viscous liquid medium by filling means connectable to the housing of the fluid friction clutch.

5. A method as defined in claim 1; and further comprising the step of filling the housing of the fluid friction clutch with a preassigned basic amount of viscous liquid medium prior to the torque generating and torque measuring steps.

6. A device for filling a fluid friction clutch having a housing, a drive side and a driven side, comprising: drive means connectable to the drive side of the fluid friction clutch; torque measuring means connectable to the driven side of the fluid friction clutch; filling means connectable to the housing of the fluid friction clutch for delivering a viscous liquid medium; and control means having an input side connectable to the torque measuring means and an output side connectable to the filling means for signalling the filling means to fill the housing of the fluid friction clutch with an amount of the viscous liquid medium yielding a preassigned target torque value depending on the actual transmitted torque values delivered by the torque measuring means said control means being provided so as to deliver the viscous liquid medium to the clutch while receiving the torque values delivered by the torque measuring means.

7. A device as defined in claim 6; and further comprising check valve means provided on the housing of the fluid friction clutch so as to connect the filling means thereto.

8. A device as defined in claim 6; and further comprising a supply tank for storing the liquid medium, said filling means including a proportioning pump provided so as to be actuatable by the control means for a rate-controlled delivery of the liquid medium from the supply tank to the housing.

9. A device as defined in claim 8, wherein the proportioning pump is provided so as to deliver a constant rate of flow per unit time.

* * * * *